(12) United States Patent
Thomas et al.

(10) Patent No.: US 6,807,312 B2
(45) Date of Patent: Oct. 19, 2004

(54) ROBUST CODEBOOKS FOR VECTOR QUANTIZATION

(75) Inventors: Renjit Tom Thomas, Vancouver, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 641 days.

(21) Appl. No.: 09/905,565

(22) Filed: Jul. 13, 2001

(65) Prior Publication Data

US 2003/0012446 A1 Jan. 16, 2003

(51) Int. Cl.[7] .................................................. G06K 9/46
(52) U.S. Cl. ....................... 382/253; 382/250; 382/251; 704/222; 704/230; 375/240.22; 375/240.29
(58) Field of Search ................................ 382/232, 233, 382/238, 239, 240, 246, 248, 250, 251, 252, 253, 278; 704/256, 201, 233, 224, 219, 204, 208, 223, 222, 230; 708/801; 375/240.22, 240.16, 240.29, 240.12, 240.03, 265; 348/405.1

(56) References Cited

U.S. PATENT DOCUMENTS

| | | | |
|---|---|---|---|
| 5,247,348 A | * | 9/1993 | Israelsen et al. ............. 725/67 |
| 5,506,801 A | * | 4/1996 | Tawel .......................... 708/801 |
| 5,596,659 A | | 1/1997 | Normile et al. |
| 5,600,754 A | * | 2/1997 | Gardner et al. ............. 704/221 |
| 5,721,791 A | | 2/1998 | Maeda et al. |
| 5,751,856 A | | 5/1998 | Hirabayashi |
| 5,822,465 A | | 10/1998 | Normile et al. |
| 6,072,910 A | | 6/2000 | Maeda et al. |
| 6,154,572 A | * | 11/2000 | Chaddha ..................... 382/253 |
| 6,438,258 B1 | * | 8/2002 | Brock-Fisher et al. ...... 382/128 |
| 6,717,990 B1 | * | 4/2004 | Abousleman ............... 375/265 |

OTHER PUBLICATIONS

Y. Linde, A. Buzo and R.M. Gray "An Algorithm for Vector Quantizer Design," IEEE Trans. on Communications, vol. COM–28, No. 1, pp. 84–95, Jan. 1980.

* cited by examiner

*Primary Examiner*—Bhavesh M. Mehta
*Assistant Examiner*—Ali Bayat
(74) *Attorney, Agent, or Firm*—Marger Johnson & McCollom, Inc.

(57) ABSTRACT

A method for data compression. An encoder receives data vectors from an original data set. The encoder uses a vector quantization codebook to encode the data vectors into encoded vectors. The codebook is constructed from a compound data set, where the compound data set includes real data vectors and artificial data vectors. The encoded vectors are indexed in the codebook and the indexes are transmitted across communication channels or transmitted to storage.

17 Claims, 3 Drawing Sheets

Figure 4a
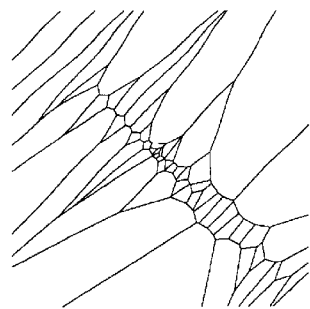
Figure 4b
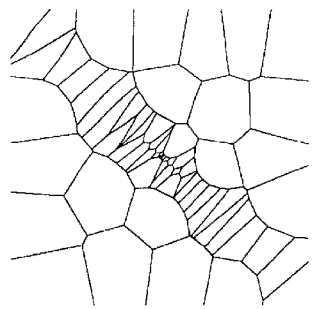
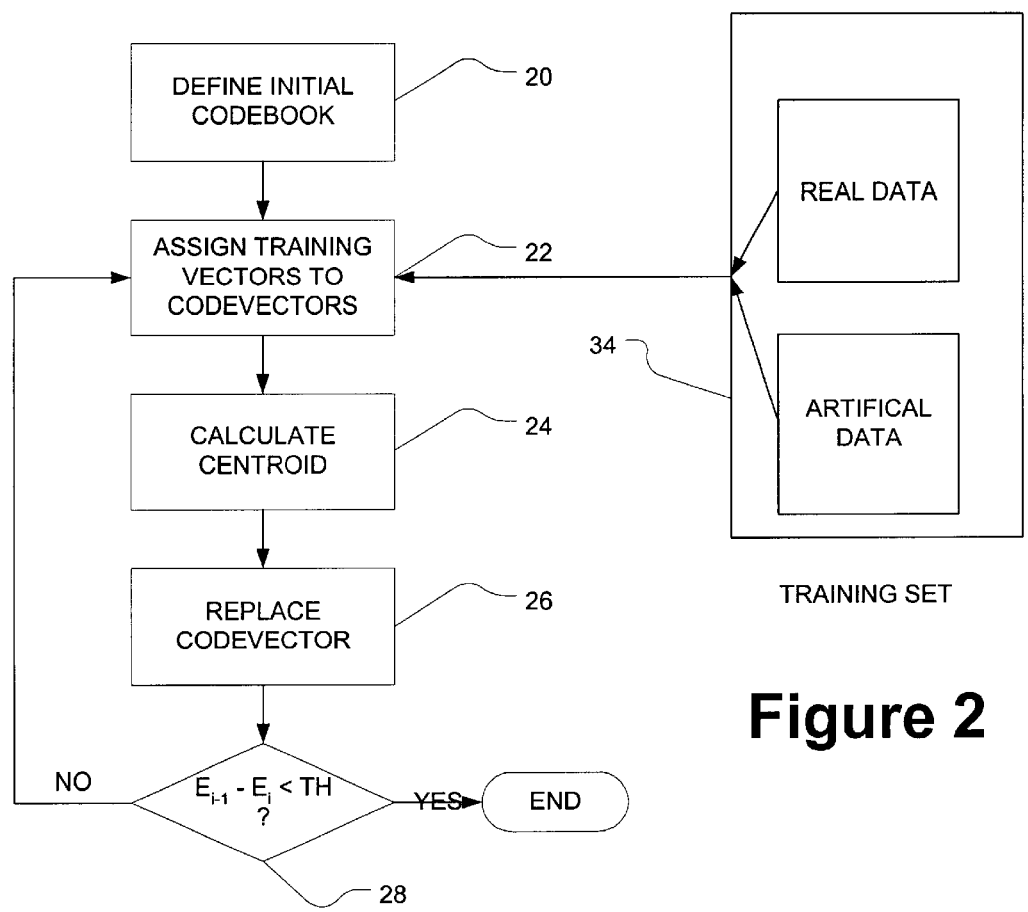
Figure 2

ROBUST CODEBOOKS FOR VECTOR QUANTIZATION

BACKGROUND

1. Field

This disclosure relates to vector quantization for the compression of image, video, speech, audio, or other data types, more particularly to methods for developing codebooks for vector quantization.

2. Background

Data compression techniques attempt to reduce the amount of information necessary to reconstruct the original entity, while still providing enough information to reconstruct the original entity. For example, image compression compresses the amount of data necessary to reconstruct an original image. Speech compression compresses the amount of data needed to compress speech. These of course are examples as compression can be applied to any kind of data.

Vector quantization is a lossy compression technique. Vector Quantization technique (or VQ) partitions the entire data space into a series of representative regions. Within each region, approximations are designated, referred to as codevectors. The regions and codevectors are developed through a training procedure, using typical data sets, such as typical speech patterns or typical images. A typical training procedure was originally proposed in 1980 by Linde, Buzo and Gray and is therefore sometimes referred to as LBG algorithm.

LBG algorithm uses relative occurrences of the patterns in the training images. Typically a large number of training data sets are used for training. Generally, this approach works well for typical patterns. However, rare data combinations may occur that are completely missed by the training set. The resulting codebook will perform very badly when those data combinations occur.

One solution is an approach referred to as Lattice VQ. This approach mathematically partitions the data space into equal regions and includes the rare data patterns. This will have a reasonable performance if the source is also uniformly distributed in the vector space. However, it performs very poorly if the source has a skewed distribution.

Therefore, an approach is needed that performs well with typical data sets, and also with the rare patterns as with the Lattice VQ.

SUMMARY

One aspect of the disclosure is a method for data compression. An encoder receives data vectors from the original data to be compressed. The encoder uses a vector quantization codebook to encode the data vectors into encoded vectors. The codebook is produced using a training set having a compound data set, where the compound data set includes real data vectors and artificial data vectors. The encoded vectors are indexed in the codebook and the indexes are transmitted across communication channels or transmitted to storage.

Another aspect of the encoder is the artificial data set. The artificial data set may include a uniformly distributed data set, a diagonal data set, or both.

BRIEF DESCRIPTION OF THE DRAWINGS

The invention may be best understood by reading the disclosure with reference to the drawings, wherein:

FIG. 2 shows a flowchart of one embodiment of a method to produce a VQ codebook, in accordance with the invention.

FIG. 4a shows one embodiment of Voroni cells corresponding to actual data used in vector quantization.

FIG. 4b shows one embodiment of Voroni cells corresponding to a compound data set used in vector quantization, in accordance with the invention.

DETAILED DESCRIPTION OF THE EMBODIMENTS

Vector quantization is one of the popular compression algorithms, which can be applied to both speech compression and image compression. It is generalized from scalar quantization to the quantization of a multi-dimensional vector, an ordered set of real numbers. The jump from one dimension to multiple dimensions is a major step that allows many new ideas, concepts, techniques, and applications.

A vector can be used to represent any type of ordered data, such as a segment of a sampled speech waveform or a block of image pixels. Vector quantization can be viewed as a form of pattern recognition where an input vector is "approximated" by one of a predetermined set of standard patterns, or in other words, the input vector is matched with one of a stored set of templates or code words. This predetermined or stored set of patterns, templates, or code words is called a 'codebook.' In compression applications, the index of the matched pattern in the codebook is stored or transmitted. This index may or may not be compressed by some lossless compression methods, such as Huffman coding. When a decoder receives the index, the decoder looks up the corresponding pattern in the codebook and outputs the pattern as decoded results. Therefore, a VQ decoder usually has very low complexity and can be implemented by a single-table look-up operation for each reconstructed vector.

A VQ encoder is usually much more complex than the VQ decoder. A straightforward way to implement a VQ encoder may involve a full search of the closest pattern in the codebook for each input vector, comparing the input vector with the code words in the codebook one by one. Since the full-search VQ requires a lot of computations in the encoder, many efforts have tried to simplify the encoder. For example, using a tree-search concept, lead to tree-structured VQ. Dividing the vector into smaller subvectors, resulted in a hierarchical VQ (HVQ). However, most of those simplifications are sub-optimal as the matched codeword may not be the closest one, but only a codeword close to the optimal one.

Figure 1:
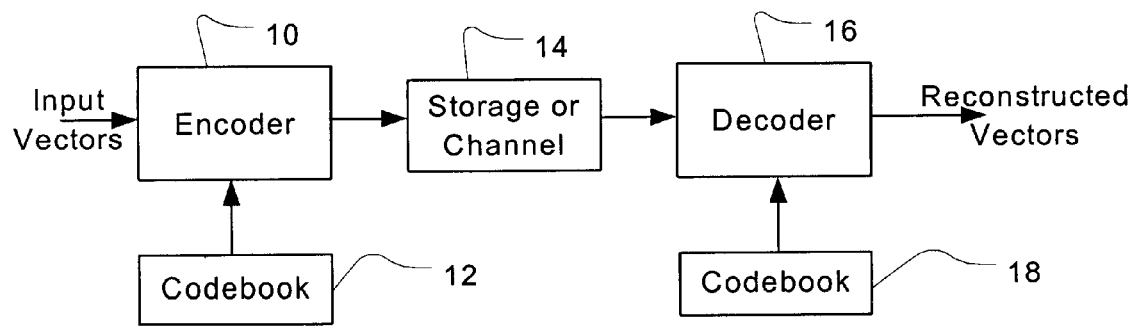
FIG. 1 shows one embodiment of a vector quantization encoder/decoder pair, in accordance with the invention.

A block diagram of VQ encoder and decoder are shown in FIG. 1. The encoder 10 receives input vectors computed from the source data. The encoder then approximates the input vectors using the vectors in the codebook and an index identifying the particular vector in the codebook is either stored or transmitted at 14. The most common applications for data compression are to reduce the amount of space required to store data or the amount of bandwidth needed to transmit it.

When desired, the decoder will reconstruct the original vectors using a decoder 16. The decoder takes the indexes stored or transmitted at 14 and uses a codebook 18 that contains the same information as the codebook used by the encoder. This allows the decoder to reconstruct the original input vectors and allows the original data to be reconstructed.

This is a lossy compression process, where the reconstructed data is not the exact same as the original. The difference between the original and the reconstructed data is referred to as the error. It is left to the system designer to determine the acceptable error rate versus the acceptable compression percentage.

An important issue for VQ is construction of the codebook. A common method is to first collect a very large set of "typical" vectors, called training data or training set, and then feed this training set through Linde, Buzo, and Gray algorithm, referred to as the LBG algorithm or the Generalized Lloyd algorithm. An optimal codebook can be obtained from the results of the LBG algorithm. The LBG algorithm is an iterative algorithm with an initial codebook. One way of generating the initial codebook can be just randomly selecting the desired number of vectors in the data space. LBG algorithm can then refine this codebook iteratively, based on the characteristics of the input training data.

However, since the entire space is being represented by fewer representative code vectors, it becomes very important to carefully choose the code vectors in the training stage. VQ tries to capture the characteristics of the data and develop code vectors based on the frequency and properties of the data in the training stage. Usually the code vectors are trained using the typical data from the target environment. The VQ codebooks then get "tuned" to the target environment in the training stage, so that when similar data vector occurs in the encoding stage, it can output the index of a code vector that will be very similar to the original data vector.

The performance of VQ depends on the design of a good codebook, and to obtain a good codebook depends on the judicious choice of the training data. Some of the vectors in data space may have very low probability to occur in the target environment, and they may never occur in the training set. These regions in space are not accounted for properly in the training set and in the codebook resulting in error between the original and the reconstructed data. This can be more noticeable if fewer numbers of bits, and thus a small codebook, are available for encoding. This is especially noticeable in image data in the chrominance part of the image, as color shifts are more easily detectable by the eye than shifts in luminance or gray scale.

One way to alleviate the above problem is to increase the number of typical data in the training process. However, this can make the training set impractically large. Training in VQ may take a lot of time. Further, even if more training data are added, it can never be certain as to whether all of the data vectors are accounted for in a way proportional to their occurrence.

As mentioned previously, the other approach is to use Lattice VQ where the space is mathematically partitioned into equal regions. This approach may quantize the vectors well if the data is uniformly distributed, but in typical applications this is not suitable since the real data usually have a very skewed distribution.

Another factor noticeable in the training set, especially to image data, is that the elements of the vectors often have similar values. The codebooks emphasize the diagonals, where the entries of a vector are all similar, of the multidimensional space in code-vector creation. Emphasizing the diagonals more than the other parts of the multidimensional space will have high errors in the physical pixel regions with high variations. This data will be mapped to codes lying on the diagonal, nearest to them.

However, this problem can be overcome using a combination of some artificial data, which uniformly covers the entire space and the real data from the characteristic training set. In order to account for the distribution of real data later, it seems wise to use an approach that differs from the approach in the lattice VQ that computes the codes mathematically. Instead, one may feed uniformly distributed artificial data to the training system, and the system can automatically generate the code vectors that uniformly cover the whole space. The artificial training set may have vectors of different combinations of values, and may repeat them sufficient number of times if necessary. This artificial training set will be referred to as the uniformly distributed data set.

This data set, for example, in two dimensions, looks like: (0,0), (0,1), (0,2) . . . (0,255), (1,0), (1,1), (1,2) . . . etc. Repetition may be necessary if the number of all the possible combinations of data vectors is still smaller than the number that needs to account for the desired population of the artificial data. This would yield an almost multidimensional, hexagonal-like partitioning of space. In higher dimension space, it would be more practical to feed in uniformly distributed artificial data, say for example, as generated by a suitable random number generator.

However, this has the potential problem discussed above that typical images may have a high correlation between adjacent pixels, since these are usually similar. It may be better to give more emphasis to the vector patterns where all elements in a vector are of same value. In training, the system may have another artificial set where all elements in a vector are of the same value and the value is uniformly distributed. This artificial data set will be referred to as the diagonal data set.

For example in the two-dimensional case, this artificial training data set may look like (0,0), (1,1) . . . (255,255) etc., which can also be repeated enough times to reflect the influence desired. If it is impossible to enumerate all the possible values, e.g., if the elements are real numbers, not integers, the diagonal data set can be generated by a random number generator such that the element values in different vectors are uniformly distributed.

This will perform better than the case of the pure lattice VQ, since it has more chances of having adjacent pixel regions the same. In this case, the code regions will lie along the higher-dimension diagonal. Therefore the more robust option seems to be a "mix" of the actual training set and the above-mentioned two artificial sets into one set, which will be referred to as the mixed set or the compound set. The uniformly distributed set will account for the insufficient percentage of the vectors with high variations. The diagonal data set can be used to make the overall artificial data set have closer characteristics as the target environment.

The mixing is flexible, in that one may vary the percentages of the actual data and the artificial training data. The "mixed" codes retain most of the characteristics of the real data mostly along the diagonal. It has some codes in the peripherals to account for the details, where the pixels vary greatly. If these were not there, the codes would have been mapped to some point near the diagonal. In the mixed or compound set, it may be seen that the hexagonal codes account for the details, thus reducing the error as compared to the original. Also the vectors that may not occur in the original, real data set, for example, corresponding to two ends of the main diagonal in the multidimensional space, are accounted for in a better way with regards to the partitioning of space.

FIG. 2 shows one embodiment of a method to train a VQ codebook that takes these considerations into account. At 34, the process selects a compound training data set of a real vector data set and at least one other artificial vector data set as was described in the previous section. In one embodiment, the artificial data set includes a uniformly distributed data set. In an alternative embodiment, the artificial data set includes a diagonal data set. In yet another alternative, the compound set includes both. The compound training data set is used to produce the codebook, not in the actual compression process.

At 20, the initial codebook is defined. For example, the random initialization method mentioned previously may be used to define an initial codebook with a desired number of code vectors. At 22, each of the training vectors is assigned to the closest code vector. Closeness is typically defined as a distance measure of some sort. After the assignment is made, all of the training vectors that are assigned to one code vector are formed into sets.

At 24, the centroid of each set is found. Typically, this uses the number of occurrences of the training vector as the mass and the distance measure of the vector as the distance. This newly calculated centroid is then used to replace the code vector about which that set was formed at 26.

Once the centroids are replaced, an error value is computed based on the difference between the new code vectors, $E_i$, and the previous code vector, $E_{i-1}$. The significance of the error can be defined based on a threshold; and the difference, $E_{i-1} - E_i$, is compared to the threshold to determine if the next iteration has to be performed or not. If the error difference is no longer greater than the threshold, the process ends. If it is greater than the threshold, the process returns to the assignment process with using the new collection of code vectors. In the following example, the data used is image data in a scanner-printer application. This is only for example only, no limitation to image data is intended nor should it be implied as a limit on the scope of the invention, as it is equally applicable to many different types of data. This example uses HVQ (Hierarchical VQ) for fast compression required to store and transmit image data from the scanner side to the printer side in a scanner-printer application. The resolution of the scanned image is 600 dpi, and there is lot of redundancy in the pixel patterns. Also, the correlation between the pixels is high. This enables the use of HVQ for compression of these scanned documents.

Figure 3:
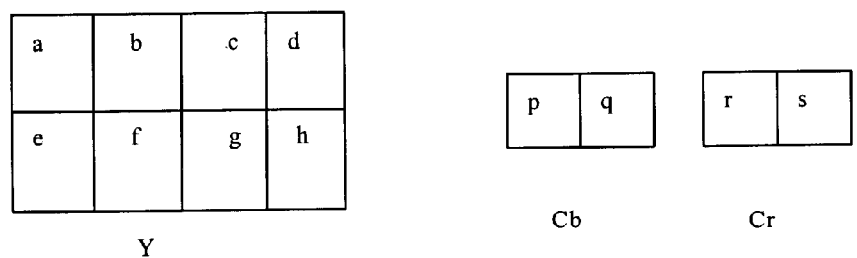
FIG. 3 shows one embodiment of footprints used to divide an image into blocks, in accordance with the invention.

It is well known that the YCbCr color space is better than the RGB color space for compression. In this example the system converts the RGB raw image received from the scanner to YCbCr image data. The human visual system (HVS) has about a half of the spatial bandwidth for the chrominance components, the Cb and Cr components here, than the bandwidth for the luminance component, the Y component. This results in an ability to down-sample the Cb and the Cr data to compress data with almost no quality degradation. The Y/Cb/Cr components are compressed separately. As for the Y component, it can be divided across the entire image into blocks of size 2 by 4 pixels, as shown in FIG. 3.

Using HVQ, the 2 by 4 block are encoded:

Code=Table$_3$[Table$_2$[Table$_1$[$a$][$b$]][Table$_1$[$e$][$f$]]][Table$_2$[Table$_1$[$c$][$d$]][Table$_1$[$g$][$h$]]]

As for the Cb/Cr components, there are just two pixel values corresponding to the physical 2 by 4 image block. This just requires coding:

Code for $Cb$=Table'$_1$[$p$][$q$]

Code for $Cr$=Table"$_1$[$r$][$s$]

Since the footprint used here just corresponds to two pixels, only 5–6 bits are necessary for encoding the chrominance part. If lattice VQ were used to handle this problem considering the entire space, this would yield an almost hexagonal partitioning of space. Since the dimension of the vector here is 2, these can be visualized as hexagonal cells partitioning the entire plane. Similar partitioning would result if the process used the uniformly distributed data set as the training set.

To account for the fact that there is a high correlation between adjacent pixels it may be more desirable if more emphasis is given to the codes where the adjacent pixels are of same value. As discussed previously, the training set may have another artificial set where the adjacent pixel values are the same, and it contains all the possible values, considered as a pair. In this case, the code regions will lie along the main multi-dimensional diagonal.

A judicious choice in the relative percentages of the above-described artificial sets and the real data set, in the codebook has to be made. Looking at the Voronoi diagrams of the space partitions corresponding to the real data, uniform quantization and the diagonal quantization, the relative percentages of the 3 sets can be decided. For example in the above case, a Voronoi diagram as in FIG. 4$a$ and FIG. 4$b$ was used. FIG. 4$a$ shows one embodiment of a Voronoi using real data. FIG. 4$b$ shows one embodiment of a Voronoi diagram using a compound set.

The mixing is flexible, for example, the above corresponds to a mixing of the real data, and one each of the artificial data sets in a ratio of 10:1:1. As seen above, the "mixed" Voronoi diagram retains most of the characteristics of the real data along the diagonal, mainly. It has some codes in the peripherals to account for the details. If these were not there, the codes would have been mapped to some point near the diagonal. In the compound set, it can be seen that the hexagonal codes account for the details, thus reducing the error as compared to the original. Also the bright colors corresponding to the edges of the diagonals are accounted for in a better way with regards the partitioning of space.

This approach can be used for any types of VQ and for similar target environments. In scanned images, a lot of the regions are "flat" in that the pixel values do not vary much in these regions. Therefore, most of the codes may pertain to these flat regions. If one considers PSNR (pixel signal-to-noise ratio) as a measure of quality in the image case, it can be seen that the PSNR would be higher if the entire image is allowed in training. The system may lose on the pixel regions with "details" generally regions of high frequency. Overall the PSNR may be high since the flat regions, which outnumber the detail regions, are encoded with higher precision.

It must be noted that such a high precision is not required for the flat regions in typical images because of the nature of the human visual system. This high precision pays the price of losing codes in the detail regions, thus causing the images to be hazier. It would be more desirable to keep less precision in the flat zones, only enough to accommodate the human visual system, to have sufficient codes in the detail regions.

Another factor to be considered is that the chrominance changes or artifacts are more easily noticed than luminance changes. The scanned images, such as those used in the example, might not have some colors, such as bright colors. If the training set had only those non-bright colors, there may have been noticeable color mismatches if the system encountered those colors in encoding. Having all of the colors would require the huge training sets discussed above. However, selection of suitable training sets to include the artificially generated sets discussed above, provides all of the colors.

Figure 5:
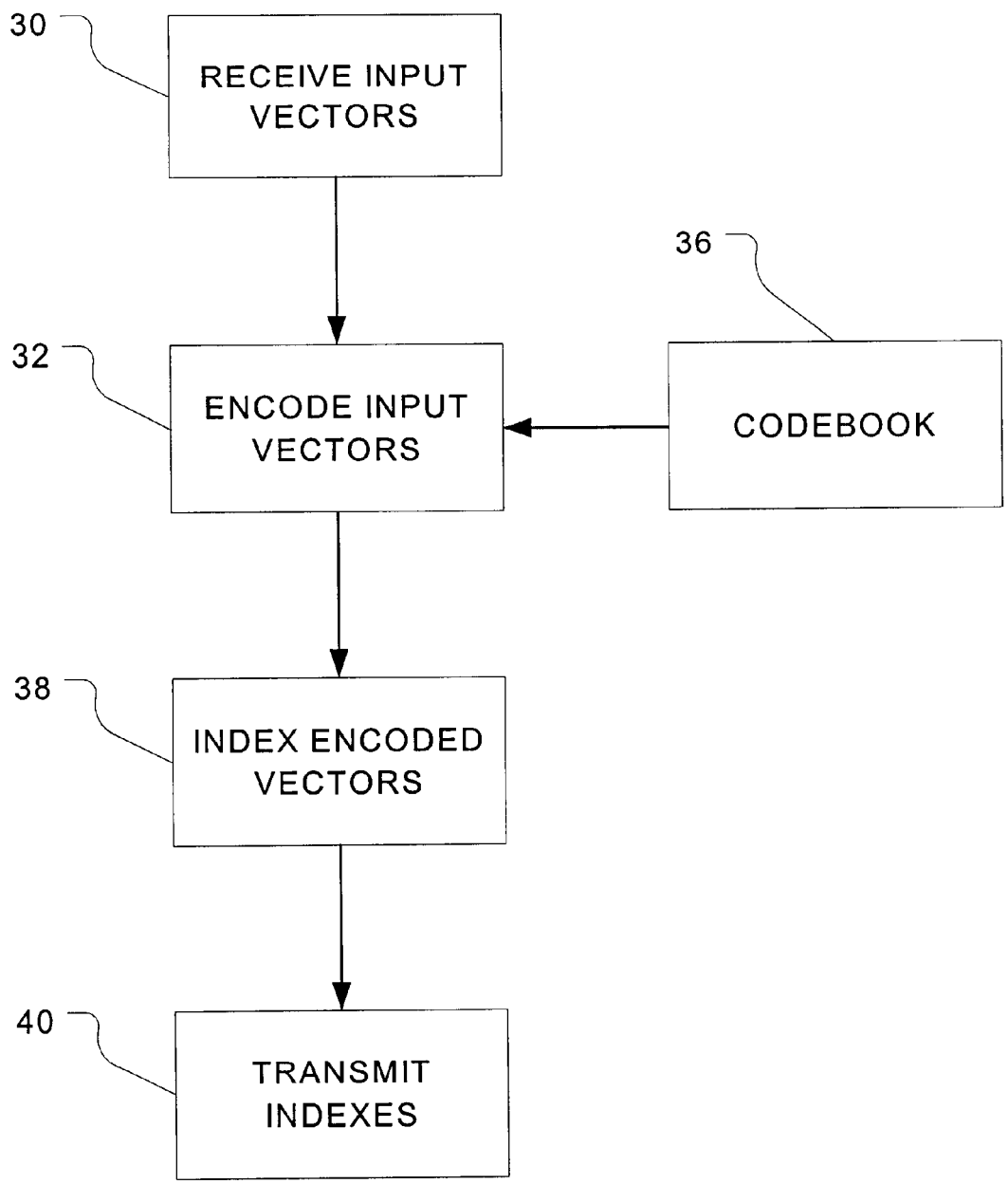
FIG. 5 shows a flowchart of one embodiment of a method of data compression using a VQ codebook, in accordance with the invention.

A flowchart of one embodiment of a method for data compression using a VQ codebook is shown in FIG. 5. The input vectors are received at 30. As mentioned above, the input vectors are ordered pairs of input data. The input data could be one of several different types of data, including image data or speech data. The input vectors are encoded at 32 using the codebook 36. The codebook 36 was computed offline from a compound data set of a real vector data set and at least one other artificial vector data set. In one embodiment, the artificial data set includes a uniformly distributed data set. In an alternative embodiment, the artificial data set includes a diagonal quantization data set. In yet another alternative, the compound set includes both. The compound data set is used to produce the codebook, not in the actual compression process.

These indices from codebook 36 are that which are transmitted at 38. Note that transmission in this example includes both transmissions across a communications channel and transmission to storage. The decoder has the same codebook and can use the indexes to determine the encoded vectors. These encoded vectors then become the approximation of the original data set, as discussed in detail above.

In many instances, this method will be implemented in software in a machine-readable form, such as in the encoder software. The machine-readable code includes the code that, when executed, implements the methods of the invention.

Thus, although there has been described to this point a particular embodiment for a method and apparatus for robust VQ encoding using compound sets, it is not intended that such specific references be considered as limitations upon the scope of this invention except in-so-far as set forth in the following claims.

What is claimed is:

1. A method of data compression, the method comprising:
   a) receiving input vectors representative of an original data set to be compressed;
   b) encoding the input vectors using a vector quantization codebook to produce encoded vectors, wherein the codebook is produced from a compound data set including:
      i) real data; and
      ii) at least one set of artificial data;
   c) transmitting the indexes of the encoded vectors.

2. The method of claim 1, wherein the original data set further comprises image data.

3. The method of claim 1, wherein the original data set further comprises speech data.

4. The method of claim 1, wherein the at least one set of artificial data further comprises a uniformly distributed data set.

5. The method of claim 1, wherein the at least one set of artificial data further comprises a diagonal data set.

6. The method of claim 1, wherein the at least one set of artificial data further comprises a uniformly distributed data set and a diagonal data set.

7. An encoder, the encoder configured to:
   a) receive input vectors from the original data set to be compressed;
   b) encode the input vectors using a vector quantization codebook to produce encoded vectors, wherein the codebook is produced from a compound data set including:
      i) real data; and
      ii) at least one set of artificial data;
   c) transmit the indexes of the encoded vectors.

8. The encoder of claim 7, wherein the original data set further comprises image data.

9. The encoder of claim 7, wherein the original data set further comprises speech data.

10. The encoder of claim 7, wherein the at least one set of artificial data further comprises a uniformly distributed data set.

11. The encoder of claim 7, wherein the at least one set of artificial data further comprises a diagonal data set.

12. The encoder of claim 7, wherein the at least one set of artificial data further comprises a uniformly distributed data set and a diagonal data set.

13. A method of producing a VQ codebook, the method comprising:
   a) defining an initial codebook having code vectors;
   b) assigning training vectors from a training set to code vectors in the training set, wherein the training set includes both real data and artificial data;
   c) calculating a centroid for a set formed from the code vectors assigned to a particular code vector;
   d) replacing the particular code vector with the centroid;
   e) determining if error has been reduced more than a predetermined threshold; and
   f) repeating assigning, calculating and replacing if the error has been reduced more than the predetermined threshold.

14. The method of claim 13, wherein the at least one set of artificial data further comprises a uniformly distributed data set.

15. The method of claim 14, wherein the at least one set of artificial data further comprises a diagonal data set.

16. The method of claim 15, wherein the at least one set of artificial data further comprises a uniformly distributed data set and a diagonal data set.

17. An article containing machine-readable code that, when executed, causes the machine to:
   a) define an initial codebook having code vectors;
   b) assign training vectors from a training set to code vectors in the training set, wherein the training set includes both real data and artificial data;
   c) calculate a centroid for a set formed from the code vectors assigned to a particular code vector;
   d) replace the particular code vector with the centroid;
   e) determine if error has been reduced more than a predetermined threshold; and
   f) repeat assigning, calculating and replacing if the error has been reduced more than the predetermined threshold.

* * * * *